(12) United States Patent
Sarkkinen et al.

(10) Patent No.: US 7,970,423 B2
(45) Date of Patent: Jun. 28, 2011

(54) CONTEXT LINKING SCHEME

(75) Inventors: Sinikka Sarkkinen, Kangasala (FI); Tuomas Hakuli, Oulu (FI)

(73) Assignee: Nokia Corporation, Espoo (FI)

( * ) Notice: Subject to any disclaimer, the term of this patent is extended or adjusted under 35 U.S.C. 154(b) by 1471 days.

(21) Appl. No.: 10/697,299

(22) Filed: Oct. 31, 2003

(65) Prior Publication Data

US 2004/0102212 A1    May 27, 2004

Related U.S. Application Data

(60) Provisional application No. 60/424,703, filed on Nov. 8, 2002.

(51) Int. Cl.
*H04B 7/00* (2006.01)

(52) U.S. Cl. ............... 455/515; 455/511; 455/552.1; 455/509; 455/433; 455/432.1; 370/352; 370/328; 370/312; 370/338; 370/401

(58) Field of Classification Search ............... 455/552.1, 455/414.1, 515, 511, 509, 433, 432.1, 435; 370/335, 338, 342, 352, 328, 312, 401
See application file for complete search history.

(56) References Cited

U.S. PATENT DOCUMENTS

| | | | |
|---|---|---|---|
| 6,701,155 B2* | 3/2004 | Sarkkinen et al. | 455/515 |
| 7,107,066 B2* | 9/2006 | Toth et al. | 455/458 |
| 7,493,084 B2* | 2/2009 | Meier et al. | 455/41.2 |
| 2002/0091926 A1* | 7/2002 | Fukutomi | 713/170 |
| 2005/0053068 A1* | 3/2005 | Toth et al. | 370/390 |
| 2006/0156370 A1* | 7/2006 | Parantainen | 725/132 |

FOREIGN PATENT DOCUMENTS

WO    WO 02 19593 A    3/2002

OTHER PUBLICATIONS

3GPP TR 23.846 0.4.0 (Jan. 2002), 3rd Generation Partnership Project; Techinical Specification Group Services and System Aspects; Multimedia Broadcast/Multicast Servive; Architecture and Functional Description (Release 6).*
ETSI TS 122 146 V5.2.0 (2202-03); Universal Mobile Telecommunications System (UMTS); Multimedia Broadcast/Multicast Service (MBMS); Stage 1 (3GPP TS 22.146 Version 5.2.0 Release 5), ETSI TS 122 146.2.0, Technical Specification, Mar. 2002, XP002271691.

* cited by examiner

*Primary Examiner* — Ajit Patel
*Assistant Examiner* — Khai M Nguyen
(74) *Attorney, Agent, or Firm* — AlbertDhand LLP (57) ABSTRACT

The present invention relates to a method and system for linking a service context to a terminal connection in a network controlling device of a data network, wherein a service indication is forwarded via the terminal connection to the data network, and an association is established between the service context and the terminal connection based on a network response to the service indication. The desired link between the terminal connection and the service context can thus be established at the network controlling device based on the forwarded service indication, e.g. cause value for establishing the terminal connection. Thereby, network resources can be optimized by releasing non-valid terminal connections.

26 Claims, 5 Drawing Sheets

CONTEXT LINKING SCHEME

CROSS REFERENCE TO RELATED APPLICATION

This application claims the benefit of the filing date of the provisional patent application Ser. No. 60/424,703, filed on Nov. 8, 2002, which is entitled Context Linking Scheme, which application is incorporated herein by reference in its entirety.

FIELD OF THE INVENTION

The present invention relates to a method and system for establishing a link between a service context created by a data network, such as an IP-based network, and a terminal connection, such as a radio connection for connecting a wireless terminal device via a radio access network (RAN) to the data network.

BACKGROUND OF THE INVENTION

Broadcast and multicast are methods for transmitting datagrams from a single source to several destinations, i.e. point-to-multipoint connection. The 3GPP ($3^{rd}$ Generation Partnership Project) specifications Release-4 and Release-99 define a cell broadcast service (CBS) allowing for low bit-rate data to be transmitted as a message-based service to all subscribers in a set of given cells over a shared broadcast channel. Furthermore, an IP-Multicast service is defined allowing for mobile subscribers to receive multicast traffic. However, this service does not allow for multiple subscribers to share radio or core network resources and as such does not offer any advantages as far as resource utilization is concerned within a PLMN (Public Land Mobile Network) and over a RAN.

In general, a broadcast/multicast service is a unidirectional point-to-multipoint service in which data is efficiently transmitted from a single source to multiple terminal devices or user equipments (UE) in the associated broadcast service area. Cell Broadcast services may be received by all users who have enabled the specific broadcast service locally on their UE and who are in the cell broadcast area defined for the service. In contrast thereto, multimedia broadcast/multicast i.e. MBMS services can only be received by such users that are subscribed to a specific multicast/broadcast service, and in addition in a multicast mode have joined the multicast group associated with the specific service. Multicast/broadcast subscription may be performed either upon user selection or due to home environment initiation.

It is noted that the abbreviation "UE" in this specification refers to both mobile terminal or mobile station (MS) in GSM (Global System for Mobile communications) terms and user equipment in UMTS (Universal Mobile Telecommunications System) terms.

It is envisaged that for some applications, multiple users can receive the same data at the same time. The benefit of multicast and broadcast in the network is that the data is sent once on each link. For example, in case of a GPRS (General Packet Radio Services) based core network, a Serving GPRS Support Node (SGSN) will send data once to a Radio Network Controller (RNC) of the RAN regardless of the number of base station devices, e.g. Node Bs in UMTS terms, and to UEs that wish to receive it. The benefit of multicast and broadcast on the air interface is that many users can receive the same data on a common channel, thus not clogging up the air interface with multiple transmissions of the same data.

With increasing use of high bandwidth applications in $3^{rd}$ generation mobile systems, especially with a large number of users receiving the same high data rate services, efficient information distribution is essential. Thus, broadcast and multicast are techniques to decrease the amount of data within the network and use resources more efficiently.

Point-to-multipoint services are expected to be used extensively over wireless networks, so that there is need for a capability in the PLMN to efficiently support them. In the 3GPP specifications TS 22.146 and TR 23.846, a Multimedia Broadcast/Multicast Service (MBMS) is defined to provide this capability for broadcast/multicast services offered by the home environment and other value added service providers. The MBMS is a unidirectional point-to-multipoint bearer service in which data is transmitted from a single source entity to multiple recipients. In particular, a broadcast mode and a multicast mode is defined as modes of operation of the MBMS.

An assumption made in the above 3GPP specifications for MBMS defines that for each MBMS service, the respective Control RNC (CRNC) or Serving RNC (SRNC) should have an MBMS context. In practice, this means that service contexts are configured at the RNC, which are not assigned to any specific UE, whereas this context is used by a number of UEs in the cell. In order to link this context with the UE specific active set e.g. of RRC (Radio Resource Control), i.e. the set which describes all the connections (i.e. Radio Access Bearers (RAB) and Radio Bearers (RB)) assigned for the UE in question, it is required that the RNC should detect those UEs which are requesting the MBMS service and for which MBMS services the RNC has already generated corresponding MBMS contexts. The RRC is a sublayer of the radio interface Layer 3 existing in the control plane only, which provides information transfer service to the non-access stratum, e.g. the core network. RRC is responsible for controlling the configuration of radio interface Layers 1 and 2 according to the OSI (Open System Interconnection) protocol layer architecture.

At present all additions and removals of radio access bearers (RAB) or radio bearers (RB) into/out the RRC active set only involve UE-specific transactions and no other relations are needed to check. However, in the present case, when the establishment of an MBMS context and a corresponding RRC connection for a UE occur at different timings, a new linking procedure is required to enhance efficiency and resource utilization.

Furthermore, according to the present MBMS specifications, the RNC cannot check whether a specific UE is authorized to receive the requested MBMS service. This authorization is needed in order to release all faulty requested RRC connections as soon as possible and in this way decrease the possibility of a misuse of RAN resources by UEs.

It is to be noted that the above problems underlying the present invention are not restricted to the above exemplary MBMS service but apply to any network-created service context which triggers generation of at least one terminal connection.

SUMMARY OF THE INVENTION

It is therefore an object of the present invention to provide a context linking scheme for improving efficiency and resource utilization in access networks. This scheme shall be applicable when the UE in question is originally in Idle mode and an RRC connection is required to be established in order to support in UE the reception of service data, such as MBMS data, e.g. from a radio interface.

This object is achieved by a method of linking a service context to a terminal connection in a network controlling device of a data network, the method comprising the steps of:

broadcasting a service notification from said data network as a result of a network-initiated creation of said service context;

setting up said terminal connection towards said network controlling device in response to a receipt of said service notification;

forwarding a service indication via said terminal connection to said data network;

receiving from a subscriber control element a confirmation of authorized service activation; and establishing an association between said service context and said terminal connection based on a network response to said service indication.

Furthermore, the above object is achieved by a terminal device for establishing a link between a service context of a service provided to said terminal device and a connection for providing said service from a data network to said terminal device, said terminal device being arranged to set up said connection and to forward a service indication via said connection in response to a service notification received from said data network.

Finally, the above object is achieved by a network controlling device for establishing a link between a service context created by a data network and a terminal connection, said network controlling device being arranged to forward to said data network a service indication received via said terminal connection, and to establish said link on the basis of a network response received in response to said forwarded service indication.

Accordingly, the network controlling device is capable of generating an association between the service specific context and the corresponding active set of the terminal connection when the terminal connection is established due to a service activation in the network. The network controlling device can thus release all terminal connections which are not valid or correctly established, e.g. for terminal devices not authorized to receive the requested service. In this way, the network controlling device can ensure that the access network resources are assigned only for those terminal devices which are authorized to receive the network service.

According to a first option, the service indication may be forwarded in a dedicated service indication message.

Alternatively, according to a second option, the service indication may be forwarded in a message used for signaling a connection request or connection completion of the terminal connection.

In both above options, the message may be an RRC message.

Furthermore, an enhanced message may be forwarded from the network controlling device to a network node having initiated the service context creation, the enhanced message requesting confirmation of authorization of the service of the service context. The network node may then respond with an acknowledgement of said confirmation request. The enhanced message may be a RANAP (Radio Access Network Application Part) message.

According to a third option, the service indication may be forwarded in a direct transfer message to the network node having initiated the service context creation.

The network node having initiated the service context creation may be an SGSN.

Furthermore, the terminal connection may be an RRC connection.

The establishing step may comprise the steps of adding the service indication into an active set of terminal connections and generating an association between the terminal connection and the service context.

The confirmation of authorized service activation may be provided by the subscriber control element upon a joining phase for multicast activation. In particular, the subscriber control element may be an SGSN, or a GGSN, or a network element controlled by a service provider. The service provider my be an external agent who is responsible of producing the multicast/broadcast services.

The terminal connection may be released if the network response indicates that the service of the service context is not confirmed.

The network controlling device may be arranged to extract the service indication from the connection request or connection complete message or from a dedicated message, according to the first and second options. In the third option, the network controlling device may be arranged to forward the service indication in the direct transfer message received via the terminal connection. In particular, the network controlling device may be arranged to forward the service indication in a RANAP message, e.g. an Initial UE message.

Additionally, the network controlling device may be arranged to add the service indication into an active set of terminal connections and to generate an association between the terminal connection and the service context.

The network controlling device may be an RNC or any other network node in charge of controlling use and integrity of radio resources, e.g. controlling the logical resources points of an access network.

Other advantageous modifications are defined in the dependent claims.

BRIEF DESCRIPTION OF THE DRAWINGS

In the following, the present invention will be described on the basis of preferred embodiments with reference to the accompanying drawings, in which.

DESCRIPTION OF THE PREFERRED EMBODIMENT

Figure 1:
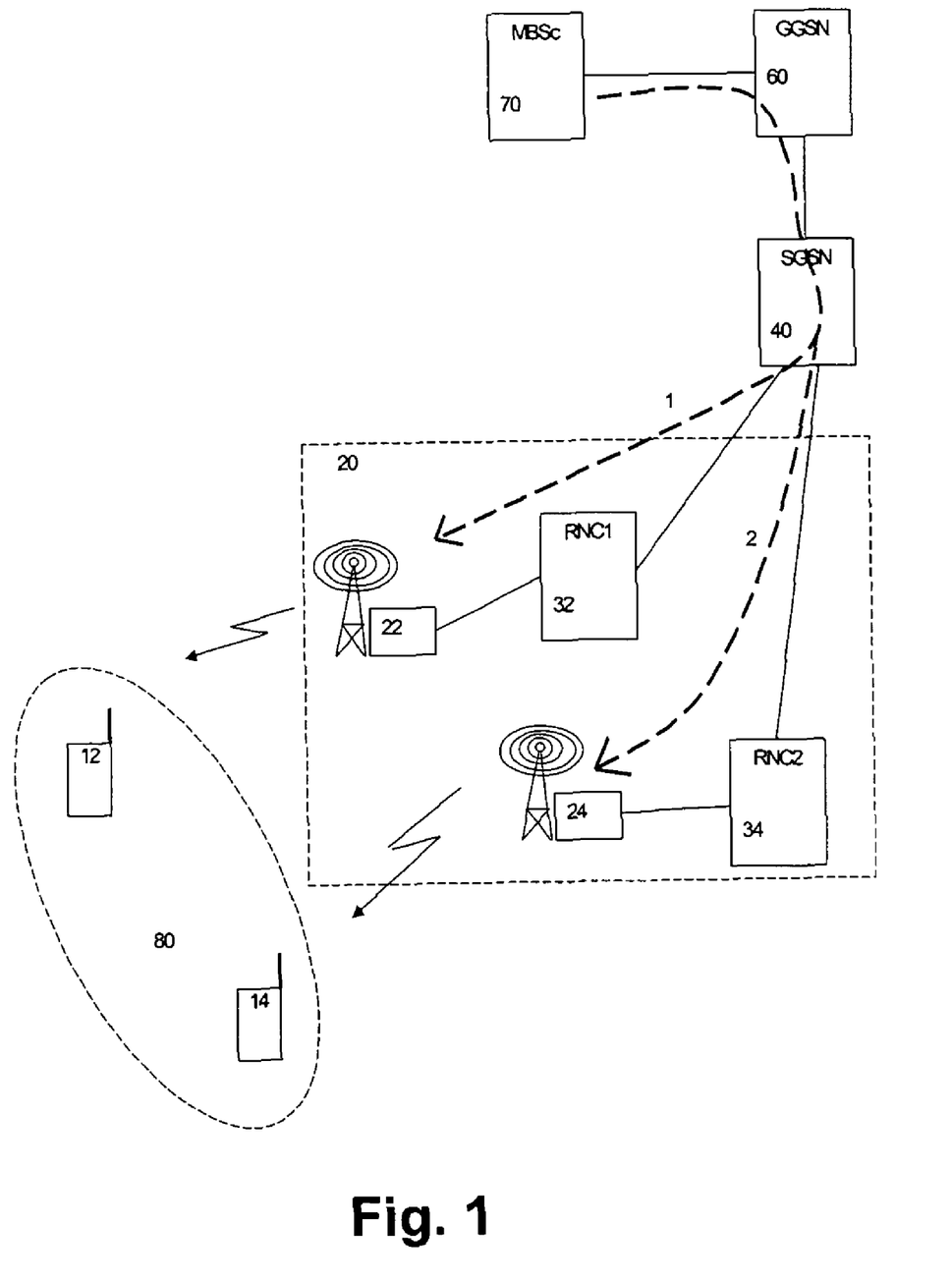
FIG. 1 shows a schematic diagram indicating an exemplary MBMS network architecture in which the present invention can be implemented.

The preferred embodiments of the present invention will now be described on the basis of an MBMS network architecture as shown in FIG. 1.

The MBMS architecture enables efficient usage of radio-network and core-network resources with the main focus on the radio interface efficiency. Specifically, multiple users are able to share common resources when receiving identical traffic. Both MBMS multicast and broadcast modes use the same low-layer bearer for data transport over the air interface of a RAN 20. According to FIG. 1, a first UE 12 and a second UE 14 are located within a broadcast or multicast area 80 and may thus receive multicast and/or broadcast services via the air interface of the RAN 20. In the shown exemplary network architecture, the RAN 20 comprises two base station devices, i.e. a first node B 22 and a second node B 24 which are connected to respective first and second RNCs 32, 34. The first and second RNCs 32, 34 of the RAN 20 are connected to at least one SGSN 40 of a core network. The SGSN 40 can be connected via a Gateway GPRS Support Node (GGSN) 60 to at least one Multicast Broadcast Source 70.

In the MBMS architecture, the SGSN 40 performs user-individual service control functions and concentrates all individual users of the same MBMS service into a single MBMS service. The SGSN 40 maintains a single connection with the source of the MBMS data, e.g. the Multicast Broadcast Source 70. Furthermore, the SGSN 40 duplicates the packets received from the GGSN 60 for forwarding to each RNC of the RAN 20 involved in provision of a specific MBMS service. It is noted that the SGSN 40 and the GGSN 60 are specific support nodes introduced in GPRS-based core networks to provide a packet-switched domain in the core network by establishing GTP (GPRS Tunneling Protocol) tunnels.

The GGSN 60 terminates the MBMS GTP tunnels from the SGSN 40 and links these tunnels via the initially described IP multicast functionality with a MBMS data source, e.g. the multicast broadcast source 70. In particular, the GGSN 60 duplicates the packets received from the Multicast Broadcast Source 70 for forwarding to each SGSN to which a GTP tunnel is established for a specific MBMS service.

It is noted that the present architecture allows for other MBMS data sources. Internal data sources may directly provide their data, while data delivery by external data sources may be controlled by boarder gateways (BG) which may allow for example data from single addresses and ports to pass into the PLMN for delivery by an MBMS service. The architecture assumes the use of IP multicast between the BGs and the MBMS data sources.

In the case shown in FIG. 1, the flow of multicast broadcast service data from the Multicast Broadcast Source 70 to the first and second UEs 12, 14 is indicated by respective broken arrows 1, 2. As can be seen, the multicast broadcast service data packets flow is split at the SGSN 40 into the two paths indicated by the broken arrows 1, 2.

In case of an MBMS broadcast service, service provision consists of six phases. An initial Service subscription phase is carried out once between subscriber and service provider. In a following service announcement phase, the first and second UEs 12, 14 are informed about forthcoming services. Then, in a subsequent MBMS broadcast mode bearer setup phase network resources are established for MBMS data transfer.

It is noted that the term "bearer" is used for designating an information transmission path of defined capacity, delay, bit error rate, etc. In particular, the RAB is a service the access stratum of the RAN provides to the non-access stratum of the core network for transfer of user data between a UE and the core network. The RB designates a service provided by the protocol layer 2 for transfer of user data between a UE and the RAN.

In a subsequent MBMS notification phase, the first and second UEs 12, 14 are informed about the forthcoming broadcast data transfer. In response thereto, a data transfer phase is initiated where the MBMS data are transferred to the first and second UEs 12, 14. In the final MBMS broadcast mode bearer release phase, the network resources for MBMS data transfer are release, e.g. when no more MBMS data have to be transferred.

This sequence of phases may be repeated, e.g. depending on the need to transfer data. Moreover, service announcement, as well as MBMS notification may run in parallel to other phases to inform UEs which have not yet received the related service.

On the other hand, the MBMS multicast service comprises the following eight phases. In an initial subscription phase, a relationship between the user and the service provider is established, which allows the user to receive the related MBMS multicast service. Then, the service announcement phase is started and is followed by a joining phase for MBMS multicast activation, by which a subscriber joins or becomes member of a multicast group, i.e. the user indicates to the network that he or she is willing to receive multicast mode data of a specific service. Then, the above described MBMS mode bearer setup and notification phases are consecutively initiated, followed by the data transfer and broadcast mode bearer release phases. Finally, a leaving phase for MBMS multicast deactivation is initiated, by which a subscriber leaves a multicast group, i.e. the user wants to receive no longer multicast mode data of a specific service.

The subscription, joining and leaving phases are performed individually per user. The other phases are performed for a service, i.e. for all users interested in the related service. Also here, the sequence of phases may repeat, e.g. depending on the need to transfer data. Also subscription, joining, leaving, service announcement as well as MBMS notification may run in parallel to other phases.

When an MBMS service is activated, the entities of the PLMN that provide MBMS service maintain one or more MBMS contexts for each active MBMS service. An MBMS context contains information and parameters necessary for each MBMS service. Among others, the MBMS context contains the PDP (Packet Data Protocol) address which correspond to the IP address of the MBMS service, e.g. IP multicast address, and the Access Point Name (APN) used to access the MBMS service. The combination of the PDP address and the APN uniquely identifies the MBMS service.

According to the preferred embodiments, a linking scheme is provided by means of which the RNC can generate an association between the specific MBMS context of the MBMS service and the UE based RRC active set, when an RRC connection is established for the UE due to the MBMS service activation. To achieve this, the UE indicates to the RNC, which MBMS service(s) is the cause for the establishment of the RRC connection.

Figure 2:
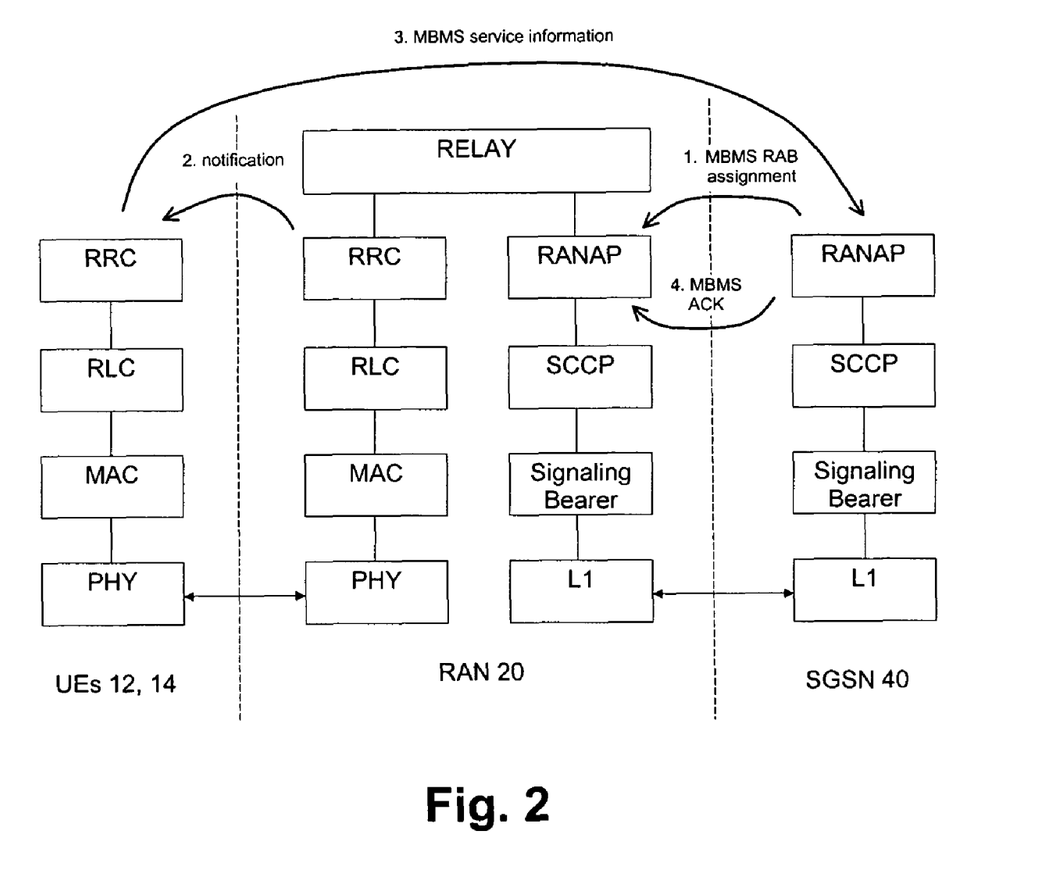
FIG. 2 shows a protocol layer architecture and the corresponding signaling requirements according to the preferred embodiments of the present invention.

FIG. 2 shows a protocol layer architecture showing the layer stacks at the first and second UEs 12, 14, at the RAN 20, and at the SGSN 40. In particular, FIG. 2 shows the control plane protocol stacks towards the packet-switched GPRS core network domain, which is used for control plane signaling in order to establish the required link. The RRC protocol layer relates to both UMTS Terrestrial RAN (UTRAN) and GSM/EDGE RAN (GERAN). The RRC protocol is used for broadcasting information related to the core network and RAN 20, paging/notification, routing of higher layer packet data units, control of requested Quality of Service (QoS), initial cell selection and re-selection, support for location services, control of security functions and mobile station or UE measurement reporting and control of such reporting. Specifically, the RRC protocol implements the QoS requirements of the RAB by establishing an RB between a UE and the RAN 20. For each RB, the RRC protocol allocates either a dedicated or a shared channel. In case of dedicated channels, RRC also takes care of radio resource allocations.

Furthermore, a Radio Link Control (RLC) protocol layer allows for data transfer in transparent, acknowledged or unacknowledged modes, and notifies errors to the upper layer. The Medium Access Control (MAC) sublayer allows transmission over the physical layer of the upper layer packet data units in dedicated or shared mode. A MAC mode is associated with a physical subchannel for use by one or more UEs. The MAC layer handles the access to and multiplexing onto the physical subchannel of mobile stations or UEs and traffic flows. Finally, with respect to the radio interface, the physical layer (PHY) offers logical channels, i.e. traffic channels and control channels, and associated transmission services.

At the Iu-PS interface between the RAN 20 and the SGSN 40, the RAN Application Protocol (RANAP) layer provides the radio network signaling over the Iu-PS interface. Furthermore, the Signaling Connection Control Part (SCCP) layer of the protocol stack, followed by a signaling bearer layer and the lowest Layer 1 form the remaining layers of the protocol stack at the Iu-PS interface. The RANAP protocol encapsulates and carries higher-layer signaling, handles signaling between the SGSN 40 and the RAN 20 and manages the GTP connection on the Iu-PS interface. Further details regarding the RANAP protocol can be gathered from the 3GPP specification TS 25.413, while the layers below the RANAP layer are defined in the 3GPP specification TS 23.121.

In the preferred embodiments, an MBMS RAB assignment is signaled by a RANAP signaling from the SGSN 40 to the RAN 20. At the RAN 20, the RANAP protocol layer is linked to the RRC protocol layer at the radio interface via a relay layer which relays the control signaling between the radio interface and the Iu-PS interface. In response to the first MBMS RAB assignment step, a notification is signaled by an RRC signaling from the RAN 20 to the respective UE, e.g. the first and second UEs 12, 14, which then respond to the SGSN 40 by signaling an MBMS service information in a third step. Finally, in a fourth step, the SGSN 40 signals an MBMS service acknowledgement to the RAN 20 using the RANAP signaling.

By using the above link signaling, the RNC, e.g. the first and second RNCs 32, 34 in FIG. 1, are capable of establishing a link or association between an active set 322 and an MBMS service context 324 stored at the RNC 32.

In the first preferred embodiment, the MBMS service specific information is added into current RRC connection setup related RRC messages, e.g. the RRC connection request or RRC connection complete messages. As an alternative, according to the second preferred embodiment, a new RRC message is introduced, which may be called "MBMS service indication message" and which includes all necessary MBMS related information. Finally, according to a third preferred embodiment, a new non-access stratum (NAS) message is introduced which contains all the necessary information, and which is sent from the concerned UE to the SGSN 40 by using a Direct Transfer (DT) message in the RAN 20 and a RANAP message, e.g. the Initial UE message, on the Iu-PS interface. It is noted that the NAS comprises all protocols between the UE and the core network, which are not terminated in the RAN 20.

In the following, the above indicated first to third preferred embodiments are described in greater detail based on processing and signaling diagrams indicated in FIGS. 3 to 5.

Figure 3:
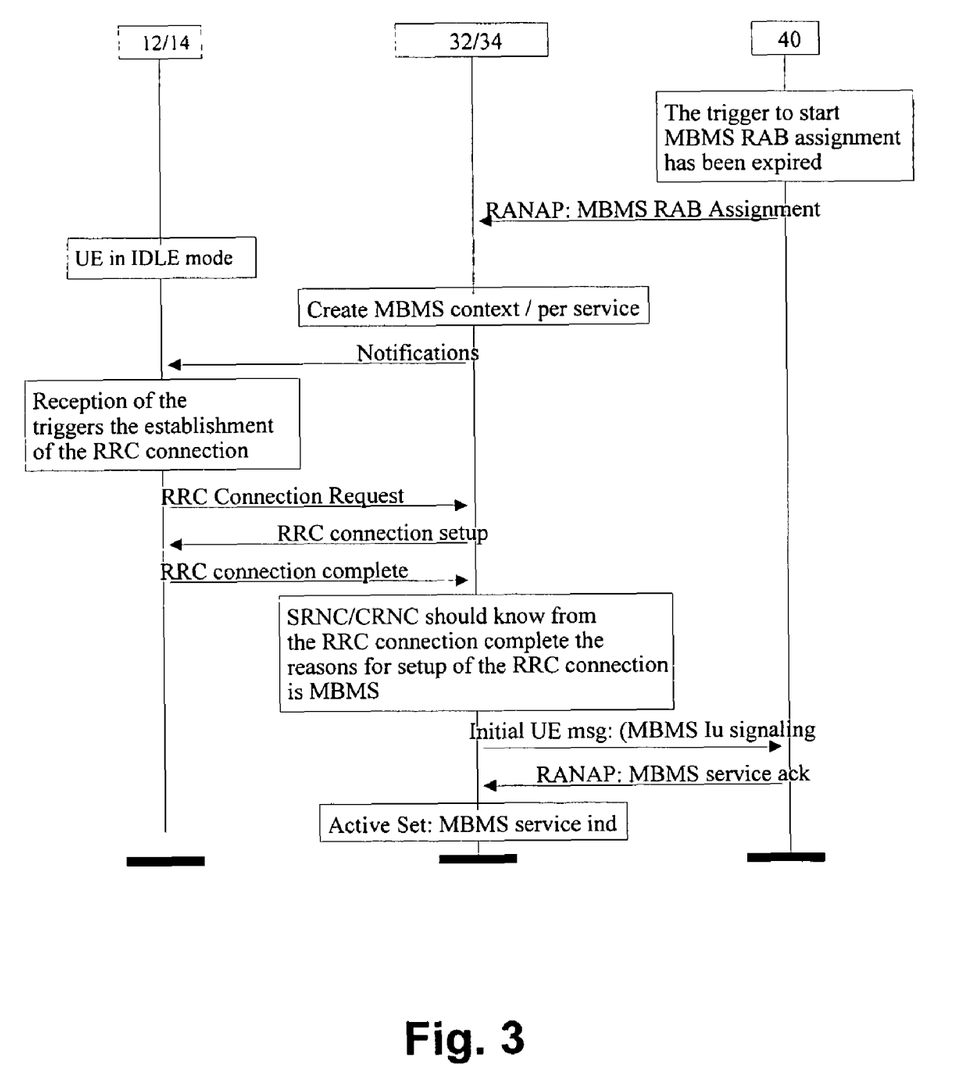
FIG. 3 shows a signaling and processing diagram according to the first preferred embodiment.

FIG. 3 shows the signaling and processing diagram of the first preferred embodiment. When it is detected at the SGSN 40, that a trigger to start MBMS RAB assignment has been expired, the SGSN 40 issues an MBMS RAB assignment message using a RANAP signaling to the concerned RNCs, e.g. the first and second RNCs 32, 34. Meanwhile, the first and second UEs 12, 14 in the concerned multicast or broadcast area 80 may be in an idle mode, i.e. a state where the UE is switched on but does not have any established RRC connection. In response to the receipt of the MBMS RAB assignment message, the first and second RNCs 32, 34 create respective MBMS contexts per service and update their service context 324. Then, the first and second RNCs 32, 34 issue corresponding notifications to the first and second UEs 12, 14 indicating the MBMS service provision. In response to the receipt of the MBMS notifications, a procedure for establishing respective RRC connections is triggered at the first and second UEs 12, 14. This procedure comprises the signaling of an RRC connection request to the first and second RNCs 32, 34 which setup the RRC connection and respond with a RRC connection setup message. Finally, the first and second UEs 12, 14 send an RRC connection complete message to the first and second RNCs 32, 34. In this RRC connection complete message, the first and second UEs 12, 14 incorporate a cause value which indicates the reason for requesting the RRC connection setup, i.e. an MBMS service reception activation in the UE. Accordingly, the RRC connection complete message is correspondingly modified.

Based on the received cause value, the first and second RNCs 32, 34 send an enhanced Initial UE message by using the RANAP signaling to the SGSN 40, which does not include any NAS packet data unit. Having received the enhanced Initial UE message, the SGSN 40 responds with an MBMS service acknowledgement message using the RANAP signaling, based on which the first and second RNCs 32, 34 can establish the link or association between the service based MBMS context and the UE related active set on RRC.

As an alternative to the above described modification of the RRC connection setup message, the RRC connection request message could be modified and used to transmit the cause value, i.e. MBMS service reception activation in UE.

Thus, according to the first preferred embodiment, the current RRC connection request or RRC connection complete messages are modified to transmit the cause value.

Figure 4:
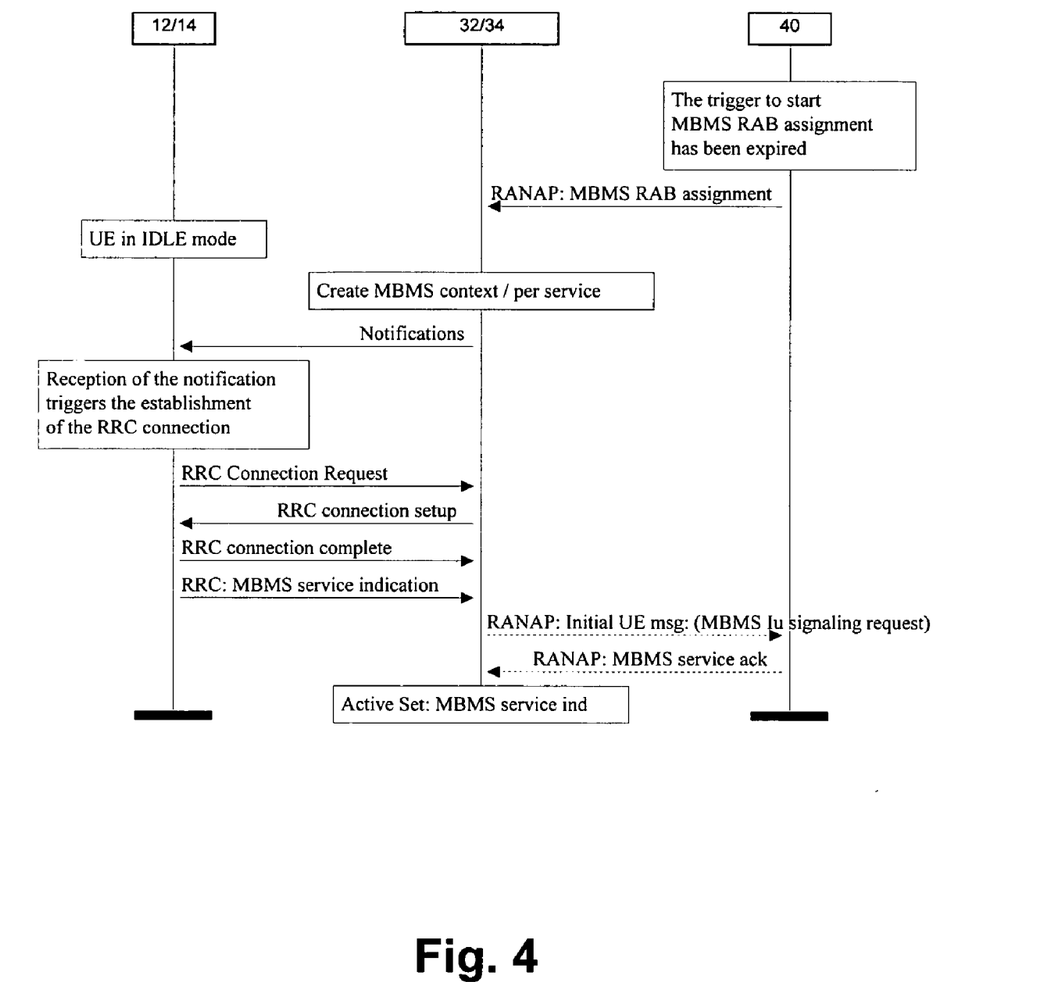
FIG. 4 shows a signaling and processing diagram according to a second preferred embodiment.

FIG. 4 shows the message and signaling diagram according to the second preferred embodiment.

This signaling diagram basically corresponds to the signaling diagram according to FIG. 3, with the exception that an additional new RRC signaling message is used to indicate that the UE is willing to receive an MBMS service. Thus, a modification of the RRC connection request or RRC connection complete message is not required in the second preferred embodiment. The new RRC signaling message may be called MBMS service indication or the like and triggers at the first and second RNCs 32, 34 a transmission of the RANAP enhanced Initial UE message to which the SGSN 40 responds by sending the RANAP MBMS service acknowledgement.

Again, the first and second RNCs 32, 34 have all information required to add an MBMS service indication into their active sets 323 of the RRC, to thereby generate an association between the respective active set and the previously established MBMS context.

Thus, according to the second preferred embodiment, a new RRC signaling message is specifically introduced for MBMS service indication while the current messages of the RRC connection setup procedure do not need to be modified.

Figure 5:
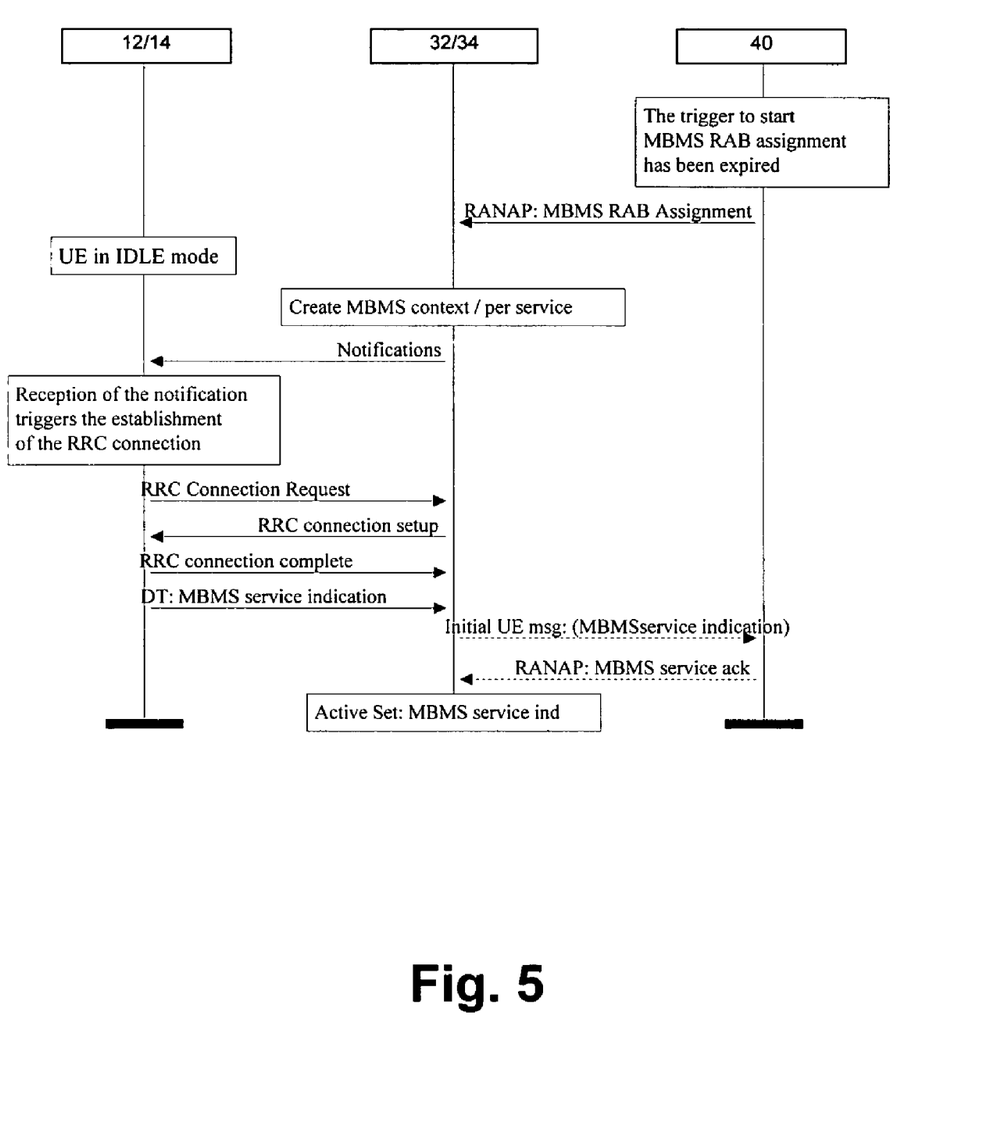
FIG. 5 shows a signaling and processing diagram according to a third preferred embodiment.

FIG. 5 shows the signaling and processing diagram according to the third preferred embodiment. Also here, main parts of the signaling and processing diagram correspond to the diagram of FIG. 3. Therefore, only the new parts are described in the following.

After the first and second UEs 12,14 have signaled the RRC connection complete message to the first and second RNCs 32, 34, they send a Direct Transfer (DT) message, which contains information about the MBMS service. This DT message may be a new NAS message to be directly routed from the first and second UEs 12, 14 via the first and second RNCs 32, 34, respectively, to the SGSN 40. In the first and second RNCs 32, 34 this DT message is handled by using normal procedures, i.e. by generating the RANAP Initial UE message in which the DT message is incorporated. After reception of the RANAP Initial UE message with the included DT message, e.g. MBMS service indication, the SGSN 40 is responsible of detecting whether the first and second UEs 12, 14 are authorized to receive the requested MBMS service. As a response, the SGSN 40 sends the RANAP MBMS service acknowledgement, based on which the first and second RNCs 32, 34 are capable of adding the MBMS service indication into their active sets 322 of the RRC, and to generate the association between the respective active set and the previously established MBMS context.

In all the above preferred embodiments, if the SGSN 40 cannot confirm the UE MBMS service indication, i.e. the first and/or second UEs 12, 14 is/are not authorized to receive the MBMS service in question, for example, the SGSN 40 may send a RANAP MBMS service non-acknowledgement (NACK), which can be the same message with a different value. Based on this MBMS service NACK message, the respective RNC releases the requested RRC connection. It is noted that the release is performed if no other service or services are included in the RRC active set of the concern UE.

Accordingly, the first and second RNCs 32, 34 are capable of linking the RRC active set with the MBMS context and can thus release all non-valid or non-authorized RRC connections. In this way, the first and second RNCs 32, 34 can ensure that the resources of the RAN 20 are assigned only to such UEs which are authorized to receive the requested MBMS service.

It is noted that the present invention is not restricted to specific features of the above preferred embodiments but can be applied to any service provision, where a service context is generated and has to be linked to a terminal connection. Moreover, any kind of signaling message can be used over the terminal connection to signal the cause value of the connection setup, i.e. a service reception activation, and any suitable message can be used for providing the confirmation signaling between the radio network controlling function of the RAN 20 and the network node triggering the concerned service. The preferred embodiments may thus vary within the scope of the attached claims.

The invention claimed is:

1. A method, comprising:
broadcasting a multimedia broadcast/multicast service notification by a data network as a result of a network-initiated creation of a multimedia broadcast/multicast service context;
receiving, at a terminal, said multimedia broadcast/multicast service notification from said data network;
setting up a terminal connection between said terminal and a network controlling device in response to the receipt of said multimedia broadcast/multicast service notification at said terminal;
sending, by said terminal, a multimedia broadcast/multicast service indication via said terminal connection to the data network;
receiving, at said network controlling device a confirmation of authorized service activation from a subscriber control element; and
establishing, by said network controlling device, an association between said multimedia broadcast/multicast service context and said terminal connection based on a network response to said multimedia broadcast/multicast service indication.

2. A method according to claim 1, wherein said multimedia broadcast/multicast service indication is sent in a dedicated service indication message.

3. A method according to claim 2, wherein said message is a radio resource control message.

4. A method according to claim 1, wherein said multimedia broadcast/multicast service indication is sent in a message used for signaling a connection request or connection completion of said terminal connection.

5. A method according to claim 1, wherein said multimedia broadcast/multicast service indication is sent in a direct transfer message.

6. A method according to claim 1, wherein said terminal connection is a radio resource control connection.

7. A method comprising:
issuing a multimedia broadcast/multicast service notification to at least one terminal as a result of a creation of a multimedia broadcast/multicast service context, said creation being initiated by a data network;
forwarding, by a network controlling device, a multimedia broadcast/multicast service indication received via a terminal connection to a node of the data network;
receiving, at said network controlling device, a confirmation of authorized service activation from a subscriber control element; and
establishing, by said network controlling device, an association between said multimedia broadcast/multicast service context and said terminal connection based on a network response to said multimedia broadcast/multicast service indication.

8. A method according to claim 7, wherein said forwarding the multimedia broadcast/multicast service indication comprises forwarding an enhanced message from said network controlling device to the network node having initiated said multimedia broadcast/multicast service context creation, said enhanced message requesting confirmation of authorization of the service of said multimedia broadcast/multicast service context.

9. A method according to claim 8, wherein said network node is a serving general packet radio service support node.

10. A method according to claim 7, wherein said network response comprises said confirmation of authorized service activation.

11. A method according to claim 7, wherein said confirmation of authorized service activation is provided by said subscriber control element upon a joining phase for multicast activation.

12. A method according to claim 11, wherein said subscriber control element is a serving general packet radio service support node, or a gateway general packet radio service support node, or a network element controlled by a service provider.

13. A method according to claim 7, wherein said multimedia broadcast/multicast service indication is forwarded in a direct transfer message to a network node having initiated said multimedia broadcast/multicast service context creation.

14. A method according to claim 7, wherein said terminal connection is a radio resource control connection.

15. A method according to claim 7, wherein said establishing said association comprises adding said multimedia broadcast/multicast service indication into an active set of terminal connections and generating an association between said terminal connection and said multimedia broadcast/multicast service context.

16. A method according to claim 7, further comprising releasing, by said network controlling device, said terminal connection if said network response indicates that the service of said multimedia broadcast/multicast service context is not confirmed.

17. A method according to claim 7, further comprising extracting said multimedia broadcast/multicast service indication from a connection request or connection complete message or from a dedicated message.

18. A network controlling device, said network controlling device comprising a processor configured to cause said network controlling device to:
- issue a multimedia broadcast/multicast service notification to at least one terminal as a result of a creation of a multimedia broadcast/multicast service context, said creation being initiated by a data network;
- forward to said data network a multimedia broadcast/multicast service indication received via a terminal connection;
- receive from a subscriber control element a confirmation of authorized service activation; and
- establish a link between the multimedia broadcast/multicast service context and the terminal connection based on a network response to said forwarded multimedia broadcast/multicast service indication.

19. A device according to claim 18, wherein said processor is further configured to extract said multimedia broadcast/multicast service indication from a connection request or connection complete message or from a dedicated message.

20. A device according to claim 19, wherein said messages are radio resource control messages.

21. A device according to claim 18, wherein said processor is configured to cause said network controlling device to forward said multimedia broadcast/multicast service indication in a direct transfer message received via said terminal connection.

22. A device according to claim 18, wherein said processor is configured to cause said network controlling device to forward said multimedia broadcast/multicast service indication in a radio access network application protocol message.

23. A device according to claim 22, wherein said radio access network application protocol message is an initial user equipment message.

24. A device according to claim 18, wherein said processor is further configured to add said multimedia broadcast/multicast service indication into an active set of terminal connections and to generate an association between said terminal connection and said multimedia broadcast/multicast service context.

25. A device according to claim 18, wherein said network controlling device is a radio network controller.

26. A system for establishing a link between a multimedia broadcast/multicast service context and a terminal connection, said system comprising:
- a terminal device; and
- a data network comprising a network controlling device, said terminal device being configured to:
  - receive a multimedia broadcast/multicast service notification from a data network;
  - set up a terminal connection between said terminal and said network controlling device in response to the receipt of said multimedia broadcast/multicast service notification at said terminal; and
  - send a multimedia broadcast/multicast service indication via said terminal connection to the data network; and
- said network controlling device being configured to:
  - issue a multimedia broadcast/multicast service notification to at least one terminal as a result of a creation of a multimedia broadcast/multicast service context, said creation being initiated by said data network;
  - forward to said data network a multimedia broadcast/multicast service indication received via said terminal connection;
  - receive from a subscriber control element a confirmation of authorized service activation; and
  - establish a link between the multimedia broadcast/multicast service context and the terminal connection based on a network response to said forwarded multimedia broadcast/multicast service indication.

* * * * *